Oct. 20, 1925.

N. PEDERSEN

AEROPLANE CAMERA

Filed Nov. 9, 1923

Inventor
Niels Pedersen
by
his Attorney

Oct. 20, 1925.
N. PEDERSEN
AEROPLANE CAMERA
Filed Nov. 9, 1923 6 Sheets-Sheet 2
1,558,272
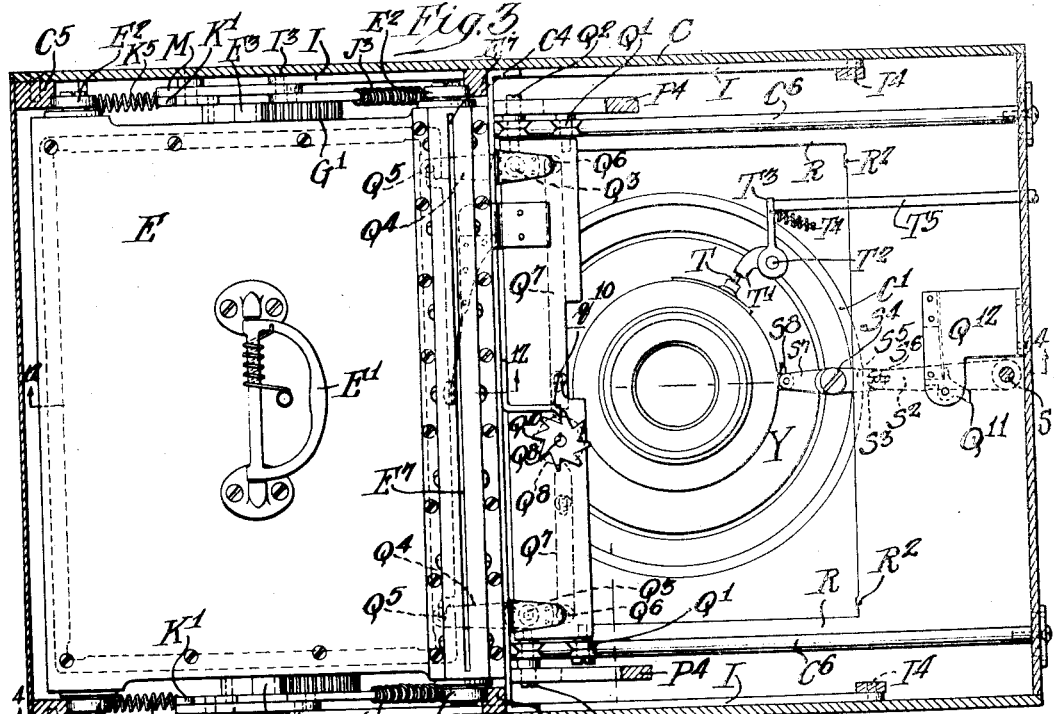
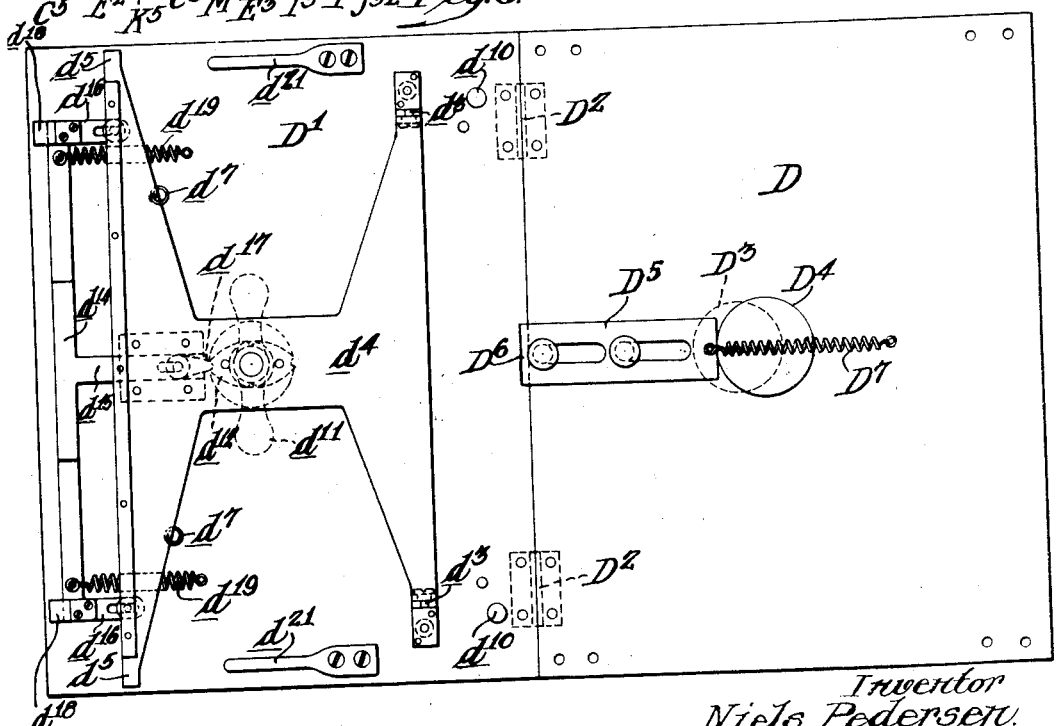
Inventor
Niels Pedersen
his Attorney.

Oct. 20, 1925.
N. PEDERSEN
AEROPLANE CAMERA
Filed Nov. 9, 1923
1,558,272
6 Sheets-Sheet 4
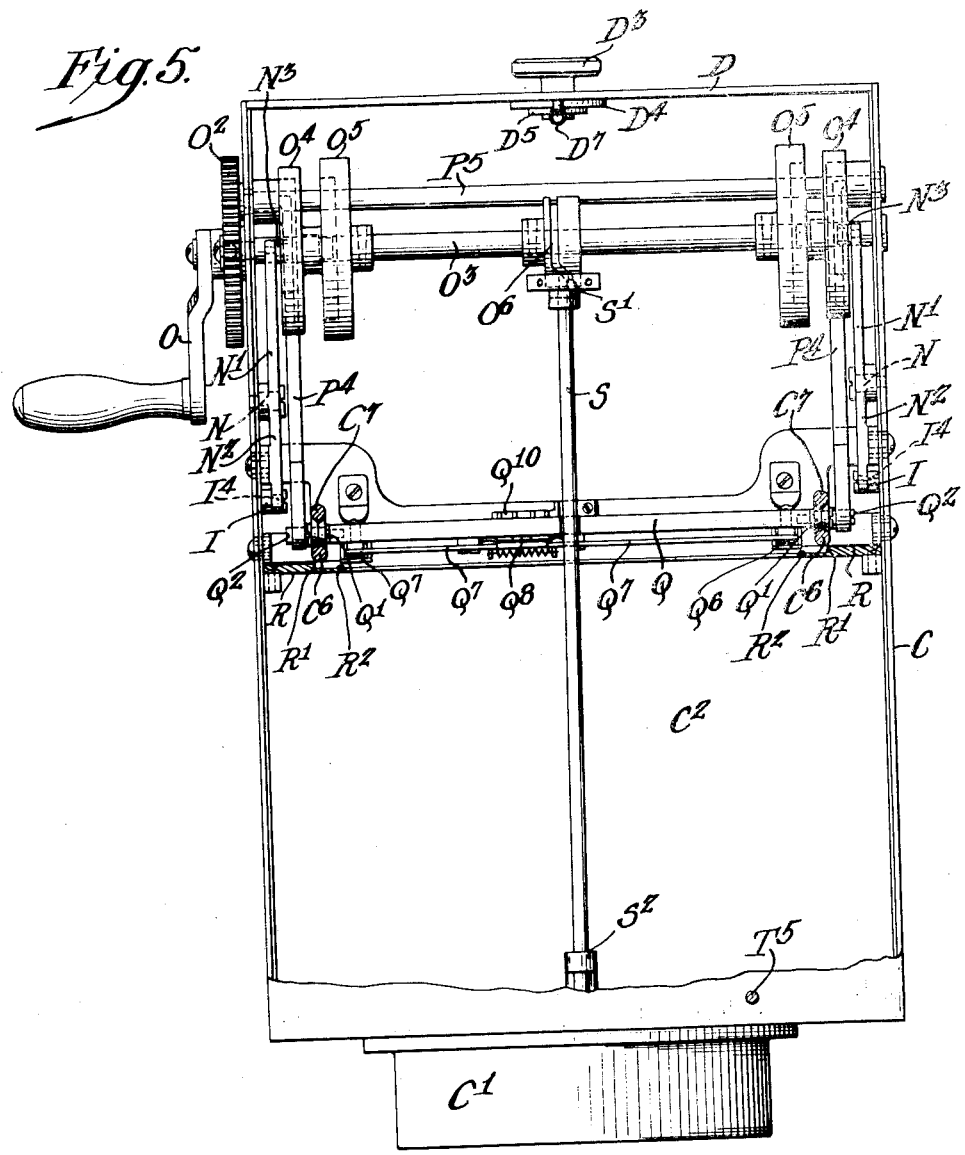

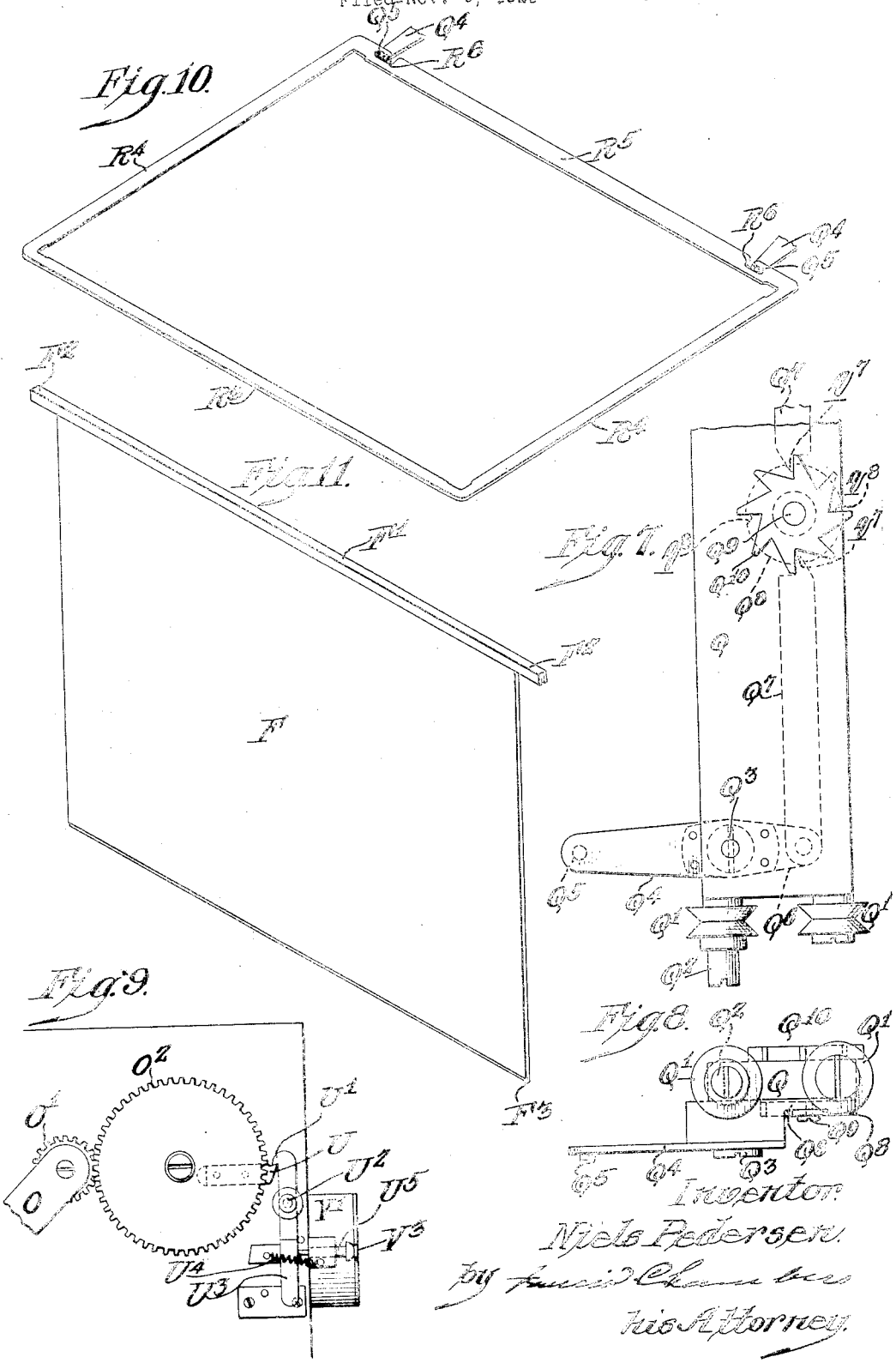

Oct. 20, 1925.  
N. PEDERSEN  
AEROPLANE CAMERA  
Filed Nov. 9, 1923

Inventor Niels Pedersen.
by his Attorney.

UNITED STATES PATENT OFFICE.

NIELS PEDERSEN, OF PHILADELPHIA, PENNSYLVANIA, ASSIGNOR, BY MESNE ASSIGNMENTS, TO BROCK & WEYMOUTH, INCORPORATED, A CORPORATION OF DELAWARE.

AEROPLANE CAMERA.

Application filed November 9, 1923. Serial No. 673,679.

*To all whom it may concern:*

Be it known that I, NIELS PEDERSEN, a citizen of the United States of America, and a resident of the city and county of Philadelphia, in the State of Pennsylvania, have invented a certain new and useful Improvement in Aeroplane Cameras, of which the following is a true and exact description, reference being had to the accompanying drawings, which form a part thereof.

My invention relates to the construction of cameras adapted for use with an aeroplane carrier and particularly to cameras provided with a magazine charged with a series of glass plates. The object of my invention is, in the first place, to so construct and combine the camera with the aeroplane that the camera can be swiveled about its axial line so as to hold the plates parallel to the actual line of flight of the aeroplane over the ground so that in taking a series of overlapping pictures, such as are needed in making maps, pictures will be taken progressively approximately in the line of flight. Other objects which I have in view are to provide for the progressive movement of the magazine in the camera so that it will successively present its contained plates to the focal plane of the camera; to provide convenient mechanism for drawing the plates from the magazine into registry with the lens and returning them again to the magazine; to provide means for locking the magazine and plate shifting mechanism in fixed position when the plate is in registry with the lens until the shutter has been actuated and the picture taken. A further object which I have in view is to provide effective means for excluding light from the plates held in the magazine, and a quite important feature of my new construction lies in the provision of plate handling frames which surround the edges of the plates without extending over them and this is for the double purpose of economizing vertical space in the magazine and of enabling the glass plates to rest directly upon the device provided for supporting it in the focal plane and in registry with the lens. Other features of my invention are also disclosed in the drawings and described in the specification and, reference being had to the drawings.

Figure 3 is a plan view of the camera taken on the line 3—3 of Fig. 2, and showing the mechanism in place in its compartments.

Figure 5 is a sectional elevation on the line 5—5 of Fig. 4.

Figure 6 is a plan view of the lid of the camera viewed from the underside.

Figure 7 is an enlarged plan view of a portion of the plate shifting carriage and its operating mechanism.

Figure 8 is a side elevation of the mechanism shown in Fig. 7.

Figure 9 is an enlarged view of a detail of the mechanism shown in Fig. 2.

Figure 10 is an isometric view of one of the plate holding frames.

Figure 11 is an isometric view of the sliding light excluding shutter used in connection with the magazine.

Figure 1:
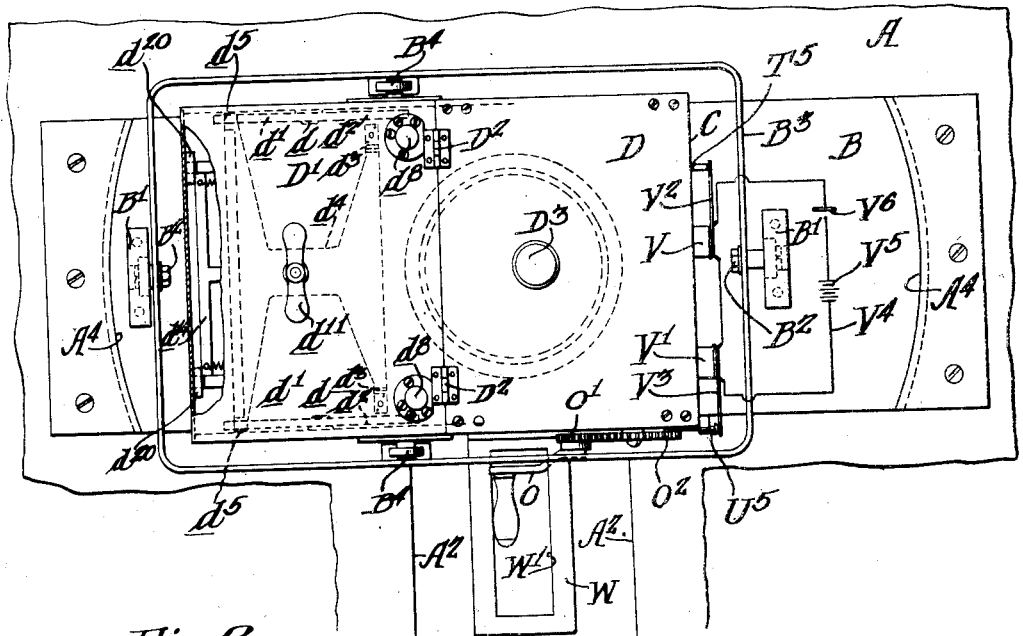
Figure 1 is a plan view of the camera showing the mode of supporting it upon the aeroplane, a portion of the lid which covers the magazine compartment being broken away to show the latching mechanism.

A indicates the platform of the aeroplane on which the camera is supported. This platform is formed with a perforation indicated at $A'$ which registers with the lens opening of the camera and is also formed with a sight opening $A^2$ from which the line of flight over the ground can be observed. $A^3$ indicates the supports secured to the platform A and supporting guideways $A^4$, $A^4$, which are segments of a circle. B is a platform rotatably secured in the guideways $A^4$, as shown, and from which extend upward the supporting standards $B'$ which in turn support the gimbal structure consisting of pivot pins $B^2$ directly attached to the standards $B'$ and on which is pivotally supported the gimbal ring $B^3$ which in turn supports, through pivot pins $B^4$, $B^4$, a camera box C having an opening in its bottom surrounded by the cylindrical ring $C'$ in which are supported the lens and shutter mechanism indicated at Y but not shown in detail as the particular construction of these parts forms no part of my invention. The camera box includes what I will call the lens chamber $C^2$ and the magazine chamber or compartment $C^3$ in which are secured vertical guideways $C^4$, $C^4$, and $C^5$, $C^5$. D is a lid portion which is secured to the top of the camera box over the lens chamber and to which is hinged the cover portion $D'$, the hinges being indicated at $D^2$ and the cover portion $D'$ closing the top of the magazine chamber. $D^3$ is a thumb wheel secured on a shaft passing through the lid portion D and having secured to its lower end a cam indicated at $D^4$. $D^5$ is a slide finger having a beveled end $D^6$ which is held against the cam $D^4$ by the spring $D^7$.

On each side of the top of the magazine chamber are pivot pins $d$ on which are pivoted rock levers $d'$ and $d^2$. $d^3$ indicates pivots secured to the hinged lid $D'$ and to which is pivotally secured the frame $d^4$, the ends $d^5$ of which rest in contact with the ends of the arms $d'$. $d^6$ is a beveled projection on the frame $d^4$, and $d^7$ indicates springs which tend to draw the frame $d^4$ upward. $d^8$ and $d^8$ indicate spring boxes secured to the top of the hinged cover $D'$, containing springs indicated at $d^9$ which act against plungers $d^{10}$ which pass down through the lid $D'$. $d^{11}$ is a rotatable handle extending through the lid $D'$ and secured to a cam $d^{12}$ on the underside of the lid; on the underside of the cam is a bevel projection $d^{13}$ which contacts with the projection $d^6$ when the handle is rotated so as to press down the frame $d^4$. $d^{14}$ is a latching bar having a lateral arm $d^{15}$ carrying a cam contacting finger $d^{17}$. $d^{16}$, $d^{16}$, are laterally projecting guide bars and $d^{18}$, $d^{18}$, latches secured to the bar $d^{14}$ which, when thrust forward, engage under the locks indicated at $d^{20}$ to lock the lid $D'$ in position. $d^{19}$, $d^{19}$, are springs acting to retract the bar $d^{14}$, and $d^{21}$, $d^{21}$, are springs secured to the lid $D'$ and contacting with the ledges indicated at $d^{22}$, when the lid is closed down.

Figure 4:
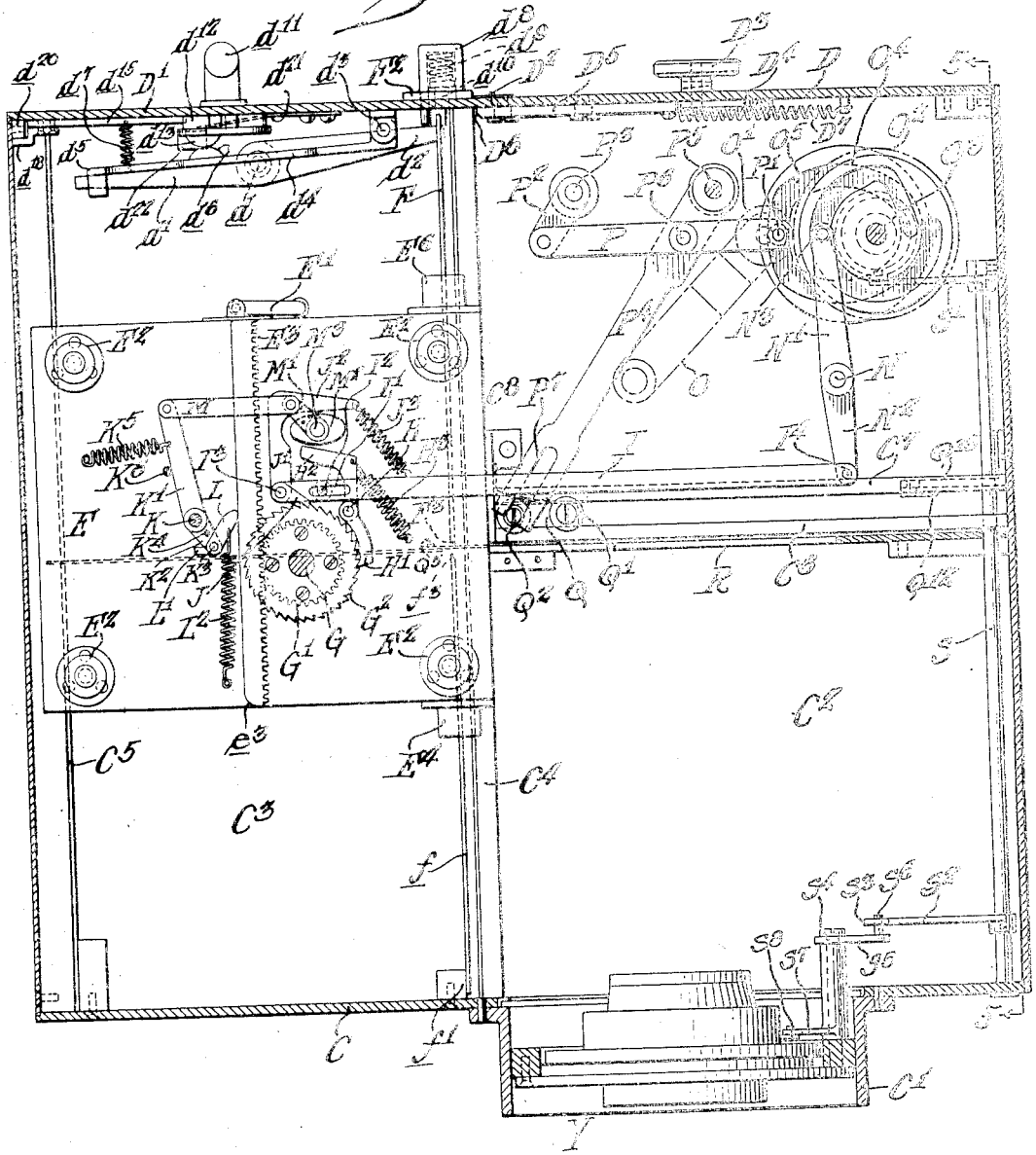
Figure 4 is a sectional elevation on the line 4—4 of Fig. 3.
Figure 12:
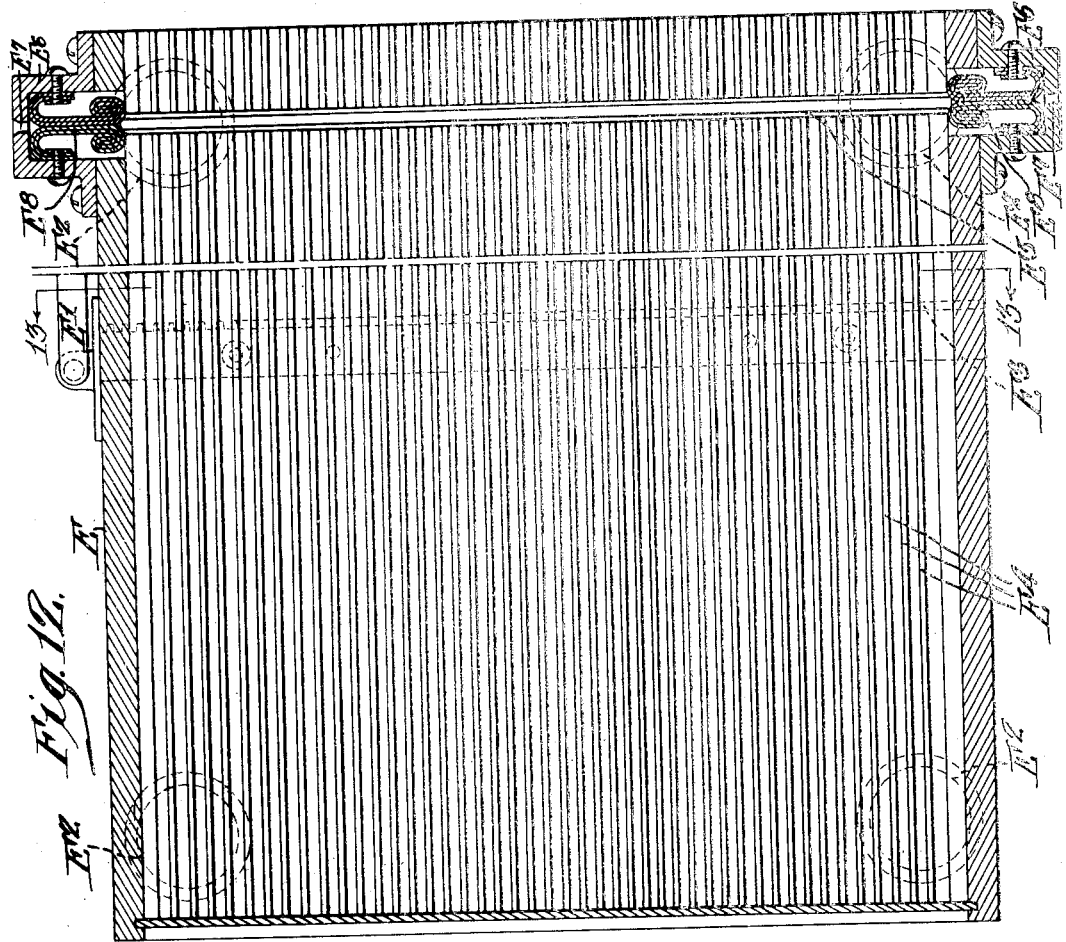
Figure 12 is a sectional elevation of the magazine taken as on the line 12—12 of Fig. 3.
Figure 13:
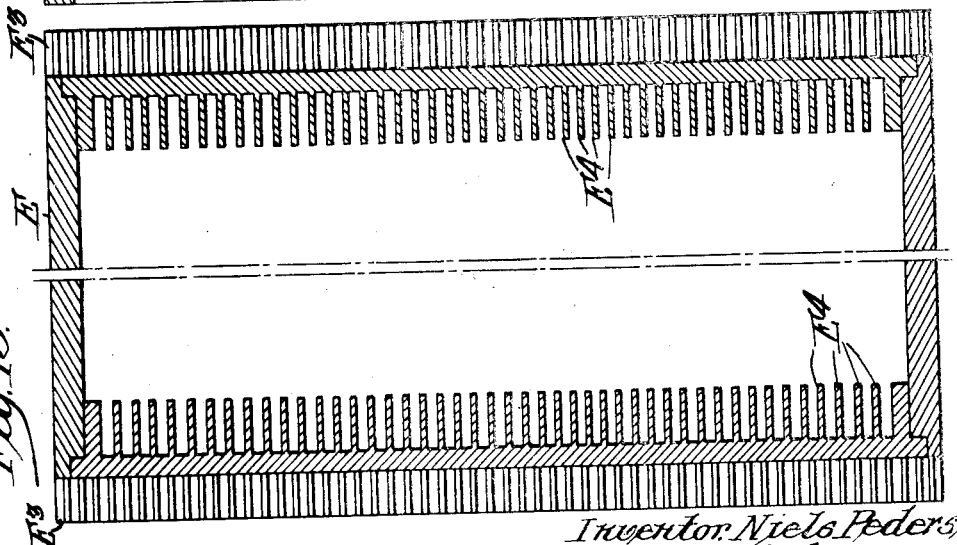
Figure 13 is a cross section taken as on the line 13—13 of Fig. 12.

E indicates the plate magazine having a handle $E'$ which is normally held folded down against the top of the magazine and guide wheels $E^2$, $E^2$, etc. which contact with the guides $C^4$ and $C^5$, to hold the magazine in proper position in the chamber $C^3$ while permitting it to move vertically in said chamber. $E^3$, $E^3$, are racks secured to the sides of the magazine and $E^4$, etc. are ledges formed on the sides of the magazine upon which rest a series of glass plates and the plate handling frames fitting around the plates. These grooves extend from the open front end of the magazine, as shown in Fig. 12. $E^5$ indicates vertical grooves formed near the front end of the magazine, opening at the top and bottom into boxes $E^6$, $E^6$, secured to the magazine, as shown in Fig. 12, having openings $E^7$ for the passage of light excluding plates and light excluding packing, as indicated at $E^8$. F is a light excluding plate which is inserted into the grooves $E^5$ through the light excluding packing $E^8$ at the top of the magazine and which closes the front of the magazine after it is charged with plates and before it is inserted in its compartment in the camera. This plate is provided with a stiff rib $F'$ on its top, the ends of which extend beyond the edges of the plate, as indicated at $F^2$, $F^2$, see Fig. 11, and the bottom edge of the plate indicated at $F^3$ is rabbeted to fit against the rabbeted top of the stationary light excluding plate $f$, the top edge of this plate being indicated at $f^2$ and the bottom of the plate $f'$ being secured to the bottom of the compartment $C^3$. The projecting ends $F^2$ extend over the ends $b^2$ of the levers $d'$, $d^2$, as indicated in Fig. 4, when the magazine is inserted in the compartment $C^3$.

Secured to each side of the compartment $C^3$ are journal pins, indicated at G, which support cog wheels $G'$, placed to engage the racks $E^3$ on the sides of the magazine, and ratchet wheels $G^2$. Also secured on each side of the chamber $C^3$ are bearing pins H on which are pivoted detent pawls $H'$ having upwardly extending arms $H^2$ formed as indicated in Fig. 4, to which arms are attached the springs $H^3$ which hold the pawls in contact with the ratchet. I, I, are reciprocating bars slotted as indicated at $I'$ and supported on pins $I^2$, the left hand end of the bar I supporting a pivot pin $I^3$ on which is pivoted a pawl J having an upwardly extending arm $J'$ from the top of which extends the arm $J^2$, $J^3$ indicating a spring which holds the pawl in contact with the ratchet. Secured on the sides of the chamber $C^3$ are pivot pins K on which are pivoted the levers indicated at $K'$, $K^2$, the lever arm $K^2$ carrying a pivot pin $K^3$ and a stop pin indicated at $K^4$. The upper arm $K'$ has attached to it the spring $K^5$ which normally holds it against the stop pin indicated at $K^6$. Pivoted on the pin $K^3$ is the finger L having a heel extension $L'$, $L^2$ indicating a spring attached to the finger L which tends to rotate it so as to bring the heel extension into contact with the pin $K^4$. Pivotally attached to the top of the lever arm $K'$ is a link M, the upper end of which is pivoted to the end of a crank arm $M'$ which in turn is attached to the cam indicated at $M^2$ pivoted on the pin $M^3$.

The slide bars I are pivoted at $I^4$ to the lower arms $N^2$ of rock levers $N'$, $N^2$, pivoted on stud bearings N secured to the side of the chamber $C^2$ and carrying cam rollers $N^3$ at their tops which lie in the side grooves of the cam discs $O^4$, these discs being secured to a shaft $O^3$, to the outer end of which, on the outside of the camera box, is secured the gear wheel $O^2$. This gear is in engagement with the gear $O'$ which is actuated by the crank handle indicated at $O$. $O^5$, $O^5$, are also cam discs secured to the shaft $O^3$, as is also the face groove cam indicated at $O^6$, see Fig. 5.

P, P, are bars having cam rolls $P'$ which are engaged by the grooves of the cam discs $O^5$. These bars are supported by the links $P^2$ pivoted on the pins $P^3$ and, by the pivot pins $P^6$, attached to the levers $P^4$, pivotally supported on the pins $P^5$ and having forked ends, as indicated at $P^7$.

Q is a carriage, to the ends of which are attached the guide wheels $Q'$ which rest upon the guideways $C^6$, $C^6$, and are held in position by the upper guideways $C^7$, $C^7$. The bearings of the right hand guide wheels $Q'$ are extended, as indicated at $Q^2$, and are engaged by the forked ends $P^7$ on the levers $P^4$. Supported on pins $Q^3$, secured on the under side of the carriage Q, are the lever arms $Q^4$ having pins $Q^5$ extending from their ends and the lever arms $Q^6$ to which are pivotally attached the bars $Q^7$, the ends $q^7$ of which rest in contact with the cam $Q^8$ having four recesses $q^8$ symmetrically disposed. The cam is secured to a rotatable shaft $Q^9$ to the upper end of which is secured a ratchet wheel $Q^{10}$, the fingers of which, as the carriage reciprocates, come alternately into contact with the stop fingers $q^{10}$, see Fig. 3, and with stop fingers $Q^{11}$, pivotally supported on the plates $Q^{12}$.

R is an aperture plate secured to the side walls of the compartment $C^2$, formed with shoulders $R'$, $R'$, which serve as guides to the plate handling frames when they are drawn over the aperture plate and provided with hardened pins $R^2$ of which there should be four, the tops being finely adjusted to the focal plane of the lens, and on which the glass plates are supported when in registry with the lens. $R^3$, see Fig. 10, indicates one of the plate handling frames which are preferably made of steel and which surround and fit reasonably close to the sides of the glass plates. The side walls $R^4$ of this frame fit fairly closely between the shoulders $R'$ of the aperture plate when they are drawn on to this plate and the front bar $R^5$ is formed with angle slots, as indicated at $R^6$, with which the pins $Q^5$ and the lever arms $Q^4$ engage, as shown in Fig. 10. The vertical height of the walls of the plate handling frame are preferably somewhat less in height than the thickness of the glass plates and no portion of the frame extends over either below or above the plate edges, that is, the plates are in nowise gripped by the frames.

S is a rock shaft carrying a lever $S'$ at its upper end which is engaged in the groove of the cam $O^6$. To the lower end of the shaft S is secured the lever $S^2$ which, by means of a fork $S^3$, engages a pin $S^6$ on the arm $S^5$ of a pivoted lever $S^5$, $S^7$, pivoted on the pin $S^4$ and engaging, as indicated at $S^8$, a shutter setting lever connected with shutter mechanism which is not shown in the drawings as it forms no part of my invention and which may be of any convenient and well known kind. T indicates a shutter releasing pin actuated by an arm $T'$ pivoted at $T^2$ and having the lever arm $T^3$ normally drawn toward the right by the spring $T^4$ and contacting with the rod $T^5$ which extends through the wall of the camera, as shown in Figs. 1 and 3.

Figure 2:
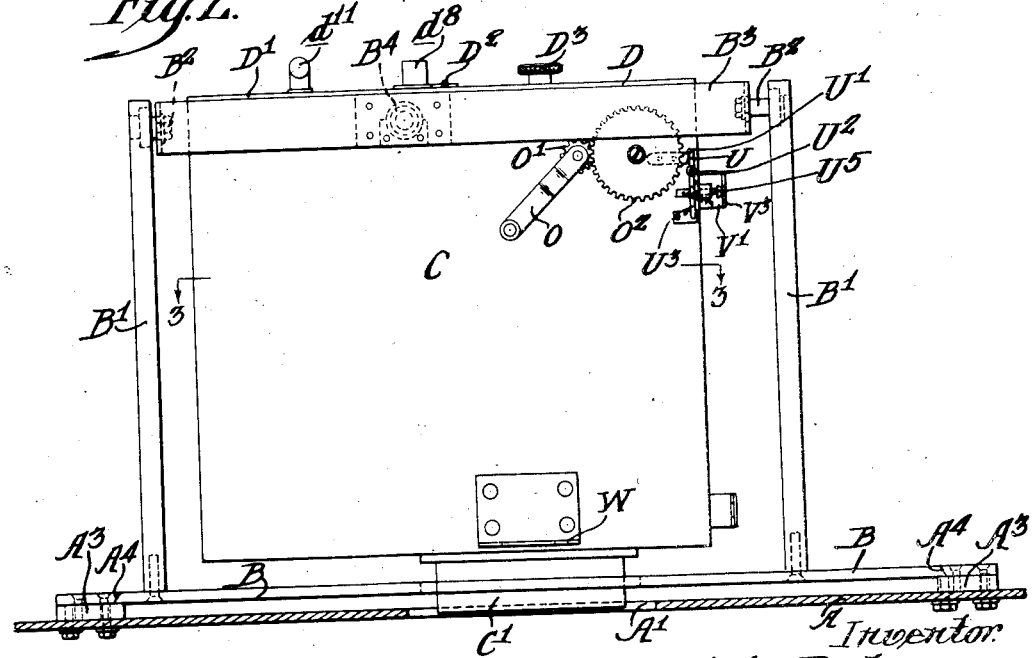
Figure 2 is a side elevation of the mechanism shown in Fig. 1.

Secured to the gear wheel $O^2$ is a projecting finger U which in one position, as indicated in Figs. 2 and 9, is engaged by the hook $U'$ pivoted at $U^2$ and connected with the lever arm $U^3$ which is normally drawn toward the right by the spring $U^4$ and lies in contact with the push pin indicated at $U^5$.

V and $V'$ are magnets, the armature plates $V^2$ and $V^3$ of which extend respectively over the push pins $T^5$ and $U^5$, as shown in Fig. 1. The magnets are located in a circuit indicated at $V^4$, Fig. 1, $V^5$ indicating a battery and $V^6$ a switch by which the circuit is closed.

W is a plate secured to the side of the camera and formed with a sight slot $W'$ which lies above the opening $A^2$ in the floor of the aeroplane and affords a convenient way for observing the line of flight over the ground.

In operation the magazine is charged with glass plates and with the plate handling frames surrounding the plates and the slide F is inserted in the grooves $E^5$ to protect the interior of the magazine and the plates contained in it from light. The hinged lid $D'$ is thrown open and the charged magazine lowered into the camera compartment $C^3$, its guiding wheels $E^2$ contacting with the guides $C^4$, $C^5$. As the magazine moves downward the ends $e^3$ of the rack bars $E^3$ come in contact with the fingers L which, when the chamber $C^3$ is empty, are drawn down to a horizontal position by the springs $L^2$ and held there by the contact of the heels $L'$ with the pins $K^4$ on the lever arm $K^2$. Further downward motion of the magazine turns the lever arms $K^2$, $K'$, in a clockwise direction around the pivot K and turns the link M toward the right, turning the crank arm $M'$ so as to rotate the cam $M^2$ through an arc of about 90°, the arms of the cam acting on the arm $J^2$ turns the lever arm $J'$ toward the left and lifts the pawl J out of contact with the ratchet $G^2$. The cam $M^2$ also pressing down on the heel extension $H^2$ rotates the pivot H and the detent pawl $H'$ to lift this pawl also out of contact with the ratchet so that the cog wheel $G'$ can rotate freely while the magazine is being pressed down to the bottom of the chamber $C^3$. As soon as the magazine is passed below the finger L the action of the springs $K^5$, $H^3$ and $J^3$ will turn the parts and pawls to active position.

As the magazine passes downward in the chamber $C^3$ the stationary light excluding plate $f$ passes through the slot $E^7$, the light excluding packing $E^8$ and into the slots $E^5$, contacting with the edge $F^3$ of the plate F so that this plate remains stationary with its lower edge approximately in the focal plane of the camera.

After the magazine has been fully inserted in the compartment $C^3$ the lid $D'$ is closed down and locked in place by rotating the handle $d^{11}$. The rotation of this handle brings the bevel projection $d^{22}$ into operative contact with the bevel projection $d^6$ on the frame $d^4$, pressing this frame downward so that its lugs $d^5$ press downward the lever arm $d'$ and turn upward the lever arm $d^2$ which, as they move upward, contact with the projecting lugs $F^2$ of the plate F and draw them upward, as indicated in Fig. 4, so as to leave between the bottom of the plate F and the top of the plate $f$ a slot through which plates held in the magazine in registry with the slot can freely pass. The plate F is again moved downward to close the slot when the handle $d^{11}$ is rotated to unlock the cover $D'$, this downward motion being effected by the action of the spring actuated plungers $d^{10}$ which rests on the top edge $F'$ of the plate F and presses it downward as soon as the levers $d^2$ permit it to move downward.

To further insure that the plate F shall fully close the magazine before it is withdrawn from the compartment $C^3$ I provide the locking slide $D^5$ which is thrust over the top $F'$ of the plate F by the rotation of the cam $D^4$ so as to hold the plate in fixed position while the magazine is being drawn out of its compartment by hand. Of course, this locking slide $D^5$ must be withdrawn before the magazine can be actually lifted from this compartment.

After the magazine has been inserted in this compartment and the actuating and holding pawls permitted to reengage with the ratchet $G^2$ a step by step lifting of the magazine to bring its contained plates successively into registry with the slot between the light excluding plates is effected by the cams $O^4$, $O^4$, rotated by means of the crank O and the gears $O'$, $O^2$, and acting through the levers $N'$, $N^2$, and the connecting rod I, to the pivot pin $I^3$ at the end of which the actuating pawl J is attached. By this pawl the ratchet is engaged and rotated in a clockwise direction, the detent pawl $H'$ holding the ratchet and the cog rotating with it in correct position while the plates are being withdrawn and returned to the magazine.

The mechanism for handling the plates is actuated by the cams $O^5$ attached to the shaft $O^3$ and connecting through the mechanism described and illustrated in Fig. 4, with the carriage Q, the wheels $Q'$ of which are guided between the guideways $C^6$ and $C^7$. As this carriage moves backward and forward across the chamber $C^2$ of the camera the ratchet or finger wheel $Q^{10}$ contacts alternately with the stop fingers $q^{10}$ and the stop fingers $Q^{11}$ giving a step by step rotation to the vertical shaft $Q^9$ and the cam $Q^8$, which cam has four cam detents $q$ symmetrically disposed around its surface while the ratchet wheel has eight fingers. The stop $q^{10}$ is set so that on contacting with a tooth or finger of the finger wheel it will give a rotation of 15° to the cam while the stop $Q^{11}$ contacting with the same finger on the outward stroke of the carriage will give the cam a rotation of 30°. The cam $Q^8$ acts upon the cam contacting ends $q^7$ of the slide bars $Q^7$ which in turn act upon the levers $Q^6$, $Q^4$, the lever arms $Q^4$ being turned and held inward when the cam contacting ends $q^7$ rest on the higher surface of the cam $Q^8$ and being permitted to assume the positions shown in Figs. 7 and 3 when the cam contacting ends engage in the detents $q^8$.

Assuming the parts to be in the position shown in Fig. 3 with the levers $Q^4$ in engagement with the slots in the frame $R^3$ the carriage will as it moves outward draw the frame and enclosed plate out over the aperture plate, the frame lying between the shoulders $R'$ and the plate resting on the pins $R^2$ in the focal plane of the lens. After exposure the carriage moves back to return the plate to the magazine and the finger $Q^4$ engages a finger of the finger wheel and gives a 30° rotation to the cam $Q^8$ which causes the contact ends of slide $Q^7$ to ride up and rest upon the higher portion of the cam and retracts the lever arms $Q^4$ to a position in which their pins register with the mouths of the slots $R^6$. As the carriage completes its backward stroke the finger $q^{10}$ contacts with the next succeeding tooth of the finger wheel and gives the cam a 15° rotation which leaves the contact ends of rods $Q^7$ still on the high portion of the cam so that the levers $Q^4$ do not engage in the slots of the plate frame as the carriage again moves away from the magazine and as the carriage, completing an outward stroke, is reversed the finger $Q^{11}$ engaging the finger which has been moved through an arc of 15° by finger $q^{10}$ and moves it through an arc of 30° at the end of which movement the contact ends of rods $Q^7$ are upon the high portion of the cam and at an angular distance of 15° from the next detent $q^8$ so that as the carriage completes its movement the pins $Q^5$ enter slots $R^6$ and as the stop $q^{10}$ contacts with the next tooth moving the cam through the 15° arc the levers $Q^4$ are thrown out and the plate R³ engaged by the pins Q⁵.

The shutter which cuts off light from the lens is set by the cam O⁶ acting through the lever arm S', rock shaft S and the mechanism actuated by this shaft through this arm S².

It will be noticed that the shape of the cams O⁴, as shown in Fig. 4, is such as to effect a limit stop to the motion of the shaft O³ in either direction and it will also be seen that the stop finger U' attached to the gear O² will, when it reaches the position shown in Figs. 2 and 9, lock this gear and the connected shaft against rotation in a return direction. The mechanism is thus locked after a plate has been brought into operative position with regard to the lens of the camera and all the movable parts actuated through the shaft O³ are held stationary until the circuit V⁴ is closed by means of the switch V⁶, with the result that the two magnets V and V' are energized and the armature plates V² and V³ respectively, contact with the shutter releasing rod T⁶ and the latch releasing rod V⁵, see Fig. 1. The crank O can then be turned in a reverse direction for two revolutions and then can return.

It will be understood that the operator looking down through the opening A² in the floor of the aeroplane can always see the direction in which the aeroplane is moving over the ground, being assisted in this operation by the slotted plate W, and by turning the camera and its plate B in the circular guide A⁴ he can maintain the camera in close alignment with the direction in which the aeroplane is actually travelling so that the successive photographs will lap end to end without angular displacement to an objectionable extent.

Having now described my invention, what I claim as new and desire to secure by Letters Patent, is:

1. In a camera for aerial photography a compartment for a plate magazine, a plate magazine vertically movable in said compartment and formed with lateral ledges to support a series of plates, means for moving the magazine vertically in its compartment to bring the series of plates successively to approximately the focal plane of the camera, means for supporting the plates in the focal plane of the camera and means for shifting the plates from the magazine to the plate supporting means and returning them to the magazine after exposure.

2. In a camera for aerial photography a compartment for a plate magazine, a plate magazine vertically movable in said compartment and formed with lateral ledges to support a series of plates, means for moving the magazine vertically upward in its compartment to bring the series of plates successively to approximately the focal plane of the camera, means for supporting the plates in the focal plane of the camera and means for shifting the plates from the magazine to the plate supporting means and returning them to the magazine after exposure.

3. In a camera for aerial photography a compartment for a plate magazine having a fixed light excluding plate extending upward from its bottom and located to enter a vertical opening in the magazine, the upper edge of said plate approximating the focal plane of the camera, a plate magazine vertically movable in said compartment and formed with lateral ledges to support a series of plates, and with a vertical opening to receive the light excluding plates, a light excluding plate slide vertically movable in said opening and adapted to contact with the top edge of the fixed plate as the magazine is inserted in its compartment, means for lifting the slide to give passage to plates lying approximately in the focal plane, means for moving the magazine vertically upward in its compartment to bring the series of plates successively to approximately the focal plane of the camera, means for supporting the plates in the focal plane of the camera and means for shifting the plates from the magazine to the plate supporting means and returning them to the magazine after exposure.

4. In a camera for aerial photography a compartment for a plate magazine, having a fixed light excluding plate extending upward from its bottom and located to enter a vertical opening in the magazine, the upper edge of said plate approximating the focal plane of the camera, a plate magazine vertically movable in said compartment and formed with lateral ledges to support a series of plates and with a vertical opening to receive the light excluding plates, a light excluding plate slide vertically movable in said opening and adapted to contact with the top edge of the fixed plate as the magazine is inserted in its compartment, means for lifting the slide to give passage to plates lying approximately in the focal plane, means for pushing down the slide to contact with the fixed plate operative while the lid of the magazine chamber is closed, means for pushing down the slide to full light excluding position operative while the magazine is lifted from its container chamber, means for moving the magazine vertically upward in its compartment to bring the series of plates successively to approximately the focal plane of the camera, means for supporting the plates in the focal plane of the camera and means for shifting the plates from the magazine to the plate supporting means and returning them to the magazine after exposure.

5. In a camera having the constructive features of claim 1, plate handling frames adapted to surround the plates without overlapping the top or bottom thereof.

6. In a camera having the constructive features of claim 1, and shutter setting and releasing mechanism, a latch for locking the magazine, moving and plate shifting mechanism operative when a plate is brought into registry with the lens and means for releasing said latch operating simultaneously with the shutter release.

7. In a camera for aerial photography a compartment for a plate magazine, a plate magazine vertically movable in said compartment and formed with lateral ledges to support a series of plates, means for moving the magazine vertically in its compartment to bring the series of plates successively to approximately the focal plane of the camera, an aperture plate having four pins for supporting the plates in the focal plane of the camera and means for shifting the plates from the magazine to the plate supporting means and returning them to the magazine after exposure.

8. In a camera for aerial photography having a compartment for a plate magazine and a hinged cover for said compartment, the combination therewith of a magazine vertically movable in said compartment and having lateral ledges to support a series of plates, an open front facing the lens chamber of the camera and vertical slots for light excluding plates slightly in the rear of its open front, a fixed light excluding plate extending upward from the bottom of the magazine chamber into the vertical slots of the magazine with its top edge approximating the focal plane of the camera, a second light excluding plate slide extending downward through the vertical slots, the bottom edge of which contacts with the top edge of the fixed plate while the magazine is lowered into its compartment, means for locking the lid of the magazine compartment in closed position, means actuated by said locking means whereby the upper plate slide is moved upward to form a slot for the passage of plates above the top edge of the lower plate, means operative as the lid is unlatched for forcing the top slide plate down into contact with the fixed plate and means for shifting the magazine vertically to bring the series of plates successively into registry with the slot between the plates.

9. In a camera for aerial photography having a compartment for a plate magazine and a hinged cover for said compartment the combination therewith of a magazine vertically movable in said compartment and having lateral ledges to support a series of plates, an open front facing the lens chamber of the camera and vertical slots for light excluding plates slightly in the rear of its open front, a fixed light excluding plate extending upward from the bottom of the magazine chamber into the vertical slots of the magazine with its upper edge approximating the focal plane of the camera, a second light excluding plate slide extending downward through the vertical slots, the bottom edge of which contacts with the top edge of the fixed plate while the magazine is lowered into its compartment, means for locking the lid of the magazine compartment in closed position, means actuated by said locking means whereby the upper plate slide is moved upward to form a slot for the passage of plates above the top edge of the lower plate, means operative as the lid the lower plate, means operative as the lid is unlatched for forcing the top slide plate down into contact with the fixed plate, means for holding the top plate slide in fixed position while the magazine is being lifted from its chamber until it fully closes the front of the magazine and means for shifting the magazine vertically to bring the series of plates successively into registry with the slot between the plates.

10. In a camera for aerial photography having a compartment for a plate magazine and vertical guideways for the magazine, the combination therewith of a rack engaging pinion, pawl and ratchet mechanism for actuating said pinion, means for temporarily disengaging the pawls from the ratchet wheel located in the path of a descending magazine, and a plate magazine having a rack which engages the pinion as it is lowered into its compartment and means for actuating the pawl disengaging mechanism so that the pinion can rotate freely as the magazine passes downward.

11. In a camera for aerial photography having a vertically movable plate magazine whereby the plates are brought successively to approximately the focal plane of the camera, the combination therewith of plate frames having angular grooves on their front edges, a reciprocating carriage, fingers pivoted on said carriage for engaging the grooves of the plate frames and means for actuating said fingers to engage and release the plate frames operating in timed relation to the movements of the carriage.

NIELS PEDERSEN.